United States Patent
D'Amico

[15] 3,652,256
[45] Mar. 28, 1972

[54] CYCLIC ESTERS OF CYANODITHIOIMIDOCARBONIC ACID AND DERIVATIVES

[72] Inventor: John J. D'Amico, Dunbar, W. Va.
[73] Assignee: Monsanto Company, St. Louis, Mo.
[22] Filed: June 20, 1966
[21] Appl. No.: 558,593

[52] U.S. Cl. ...................71/90, 260/327 M, 260/784, 424/277
[51] Int. Cl. ...................A01n 9/12, C07d 71/00, C07d 73/00
[58] Field of Search ...................260/327; 71/90; 424/277

[56] References Cited

OTHER PUBLICATIONS

Warner-Juaregg et al., Chemical Abstracts, Vol. 53 (1959), pages 340–341.

Primary Examiner—James A. Patten
Attorney—Richard O. Zerbe and F. M. Murdock

[57] ABSTRACT

New compounds of the formula

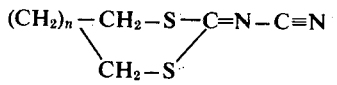

where $n$ is zero to 8, inclusive, and derivatives thereof are biological toxicants, rubber accelerators and useful intermediates.

7 Claims, No Drawings

CYCLIC ESTERS OF CYANODITHIOIMIDOCARBONIC ACID AND DERIVATIVES

The present invention relates to cyclic esters of cyanodithiomidocarbonic acid and more particularly to compounds of the formula

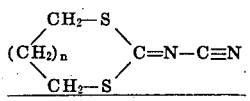

where n is 0 to 8, inclusive, and to derivatives thereof. The new compounds comprise biological toxicants, rubber accelerators, and intermediates, and the invention further relates to the use of the new compounds as intermediates and to the resulting products.

The aforesaid cyclic esters may be prepared by reacting a salt of cyanodithioimidocarbonate with an alkylene dihalide. For example, condensation of potassium cyanodithioimidocarbonate (I) [A. Hantzsch and M. Wolvkamp, Ann., 331,265 (1904)] with 1,2-dibromoethane or 1,3-dibromopropane furnished 2-cyanoimino-1,3-dithiolane (II) and 2-cyanoimino-1,3-dithiocyclohexane (III) in yields of 83.3 and 69.6 percent, respectively. Other alkylene dihalides may be used, as for example 1,4-dibromobutane, 1,6-dibromohexane, and 1,10-dibromodecane.

The cyclic esters of cyanodithioimidocarbonic acid are useful for preparing tetrathiaspiro compounds by reaction with dimercaptans and alcoholic hydrogen chloride, which process is claimed in copending application of even data of Campbell and D'Amico. Use of an alkane dimercaptan produced tetrathiaspiroalkanes of the formula

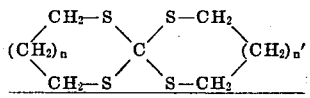

where n and n' are integers from 0 to 10, inclusive. If n' in the alkane dimercaptan, $HSCH_2(CH_2)_{n'}—CH_2—SH$, was the same as n in the cyclic ester, symmetrical tetrathiaspiroalkanes resulted; but reaction of different dimercaptans produced unsymmetrical tetrathiaspiroalkanes. The cyclic ester of cyanodithioimidocarbonic acid could be replaced by the corresponding urea in the reaction. Also, the tetrathiaspiro compounds reacted with dimercaptans, by which reaction symmetrical tetrathiaspiroalkanes were converted to unsymmetrical tetrathiaspiroalkanes. Suitable dimercaptans comprise 1,2-ethanedithiol, 1,3-propanedithiol, 1,4-butanedithiol, 1,6-hexanedithiol, 1,8-octanedithiol, 1,10-decanedithiol, and o-phenylenedithiol. It is preferred to use about equal molecular proportions of dimercaptan and cyclic ester of cyanodithioimidocarbonic acid or corresponding urea or tetrathiaspiro compound.

In the absence of mercaptan, reaction of II with an excess of hydrogen chloride-methanol solution at 25°–30°C. for a period of 24 hours gave 1-(1,3-dithiocyclopentylidene)urea hydrochloride (IV) in 76.5 percent yield. The neutralization of IV with ammonium hydroxide furnished 1-(1,3-dithiocyclopentylidene)urea (V) in 60.5 percent yield. However, V was obtained in an overall yield of 77.7 percent by combining these two reactions. Proof of structure for V was based on elemental analysis, infrared, and n.m.r. spectra.

Although it was anticipated that reaction of III with hydrogen-chloride-methanol would have yielded the corresponding urea, it was discovered that the product which formed was 1,5,7,11-tetrathiaspiro[5.5]undecane (VI) in 58 percent yield. The yield was increased from 58 percent to 90 by conducting the reaction in the presence of 1,3-propanedithiol. The product (VI) was prepared by Johnston et al. in 33 percent yield by the reaction of 2,2'-iminodiethanol with trimethylene trithiocarbonate, T. P. Johnston et al., J. Org. Chem. 27, 4,068 (1962). Where the urea is desired, it is preferred to confine the reaction temperature to 25°–40°C. However, temperatures of 60°–80°C. are preferred for reaction with dimercaptans to produce tetrathia compounds. For example, 1,4,6,9-tetrathiaspiro[4.4]nonane (VII) was prepared by reacting II and 1,2-ethanedithiol at 65°–73C. as described in Example 6 infra. When the procedure was repeated except the reaction mixture was stirred at 25°–30°C., the urea (V) was obtained in 69 percent yield.

EXAMPLE 1

2-Cyanoimino-1,3-Dithiolane (II)

To a stirred solution containing 583.2 grams (3.0 moles) of I in 10.5 liters of water, 3.0 moles of 1,2-dibromoethane was added in one portion. The reaction mixture was stirred at 25° to 30°C. for 5 days. The resulting precipitate was collected by filtration, washed with 200 ml. of ethyl ether, and air-dried at 25°–30C. II, m.p. 81°–82°C., was obtained in 83.3 percent yield. The melting point remained unchanged after recrystallization from ethyl alcohol. The infrared spectrum as determined from 10 percent solutions in chloroform and dimethylformamide contained bands at 2,980(W) and 2,910(W) (C—H st.), 2,170(VS) (C ≡ N st.), 1,515(VS) (C ═ N st.), 1,425(M) (CH$_2$ def.), 1,282(S), 1,153(M), 973(S), and 850(M) cm.$^{-1}$. The n.m.r. spectrum in deutero-chloroform had a single peak at 3.83 p.p.m. (δ), due to equivalent methylene groups. Analysis gave 19.40 percent nitrogen and 44.16 percent sulfur as compared to 19.43 percent nitrogen and 44.47 percent sulfur calculated for $C_4H_4N_2S_2$.

EXAMPLE 2

2-Cyanoimino-1,3-Dithiocyclohexane (III)

In the procedure of Example 1, 3.0 moles of 1,3-dibromopropane was substituted for the 1,2-dibromoethane. III, m.p. 95°–97°C., was obtained in 69.6 percent yield. After two recrystallizations from ethyl alcohol, it melted at 99°–100 °C. The infrared spectrum as determined from 10 percent solutions in chloroform and dimethylformamide contained bands at 2,980(W) and 2,910(W) (C—H st.), 2,160(VS) (C ≡ N st.), 1,470(VS) (C ═ N st.), 1,425 (CH$_2$ def.), 1,284(M), 1,080(S), and 967(M) cm.$^{-1}$. The n.m.r. spectrum in deuterated chloroform had a two-band system at 2 to 2.7 and 3.1 to 3.5 p.p.m. (δ) in the methylene proton region and whose areas were in a 1:2 ratio, respectively. The band systems were complex indicating a higher order spin pattern. Analysis gave 17.46 percent nitrogen and 40.56 percent sulfur as compared to 17.70 percent nitrogen and 40.53 percent sulfur calculated for $C_5H_6N_2S_2$.

EXAMPLE 3

1(1,3-Dithiocyclopentylidene) Urea Hydrochloride (IV)

To 363 grams (3.63 moles) of 36.5 percent hydrogen-chloride-methanol solution at 5°C., 87 grams (0.6 mole) of II was added in one portion. An exothermic reaction set in causing a temperature rise from 8° to 25°C. The reaction mixture was stirred at 25°–30°C. for 18 hours. After cooling to 0°C., the precipitate was collected by filtration and air-dried at 50°C. The product (IV), m.p. 206°–207°C., was obtained in 76.5 percent yield. The infrared spectrum as determined from Nujol mull contained bands at 3,300–3,100 (broad) (NH$_3$+ st.),

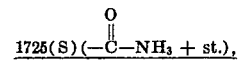

1,611(M), 1,515(S), 1,010(S), 844(S), and 722(S) cm.$^{-1}$. Analysis gave 32.56 percent sulfur as compared to 32.28 percent sulfur calculated for $C_4H_6N_2OS_2$·HCl.

EXAMPLE 4

1-(1,3-Dithiocyclopentylidene)Urea (V)

To 200 grams (2.0 moles) of 36.5 percent hydrogenchloride-methanol solution at 5°C., 72.2 grams (0.50 mole) of II was added in one portion. By means of an ice bath the reaction mixture was maintained below 30°C. for the first 30 minutes and stirring continued at 25°–30°C. for 24 hours. After cooling to 0°C., 125 ml. of water was added dropwise at 0°–10C. in 15 minutes. To this stirred reaction mixture, 150 grams of concentrated ammonium hydroxide was added dropwise at 0°–10°C. over a 15-minute period. After stirring at 0°–20C. for one hour, the precipitate was collected by filtration and air-dried at 25°–30°C. The filtrate contained no liquid, and no evidence for the formation of 1,2-ethanedithiol was noted. The product (V), m.p. 151°–153°C., was obtained in 77.7 percent yield. After recrystallization, it melted at 156°–157°C. A mixture melting point with the product obtained by neutralization of IV with ammonium hydroxide was not depressed, and the infrared spectra of the two were superimposable. Analysis gave 17.42 percent nitrogen and 39.40 percent sulfur as compared to 17.27 percent nitrogen and 39.53 percent sulfur calculated for $C_4H_6N_2OS_2$.

Example 5

1,5,7,11-Tetrathiaspiro[5.5]Undecane (VI)

To 240 grams (2.4 moles) of 36.5 percent hydrogenchloride-methanol solution at 5°C., 63.5 grams (0.4 mole) of III was added in one portion. Within a few minutes a solution resulted. The solution was stirred at 25°–30°C. for 18 hours. After cooling the resulting slurry to 0°C., 250 ml. of cold water was added dropwise at 0°–10°C. over a 15-minute period. To the stirred slurry, 164 grams of concentrated ammonium hydroxide was added dropwise at 0°–10°C. After stirring at 25°–30C. for 1 hour, the precipitate was collected by filtration, washed with water until the washings were neutral to litmus, and air-dried at 25°–30°C. The filtrate contained a small amount of an offensive-smelling liquid which was identified as 1,3-propanedithiol. The product (VI), m.p. 113°–116°C., was obtained in 58 percent yield. After recrystallization from ethyl alcohol, it melted at 119°–120°C. The infrared spectrum as determined in chloroform and dimethylformamide contained bands at 2,980(M) and 2,900(M) (C—H st.), 1,422(S) and 1,410(M) (CH$_2$ def.), 1,272(S), 1,002(M), 910(M), 882(M), 774(S), and 743(S) cm.$^{-1}$ The n.m.r. spectrum in CDCl$_3$ was identical to that reported by Johnston and co-workers.

However, it is preferred to carry out the reaction in the presence of 1,3-propanedithiol as illustrated by the following: To 70.2 grams (0.702 mole) of 36.5 percent hydrogenchloride-methanol solution at 5°C., 37 grams (0.234 mole) of III and 25.5 grams (0.234 mole) of 1,3-propanedithiol were added in one portion. After the removal of ice cooling, an exothermic reaction set in causing a temperature rise from 7° to 33°C. and in addition, a precipitate resulted. The reaction mixture was stirred at 25°–30°C. for 18 hours. After cooling to 0°C., 250 ml. of water was added dropwise at 0°–10°C. To the stirred reaction mixture 63 grams of concentrated ammonium hydroxide was added dropwise at 0°–10°C. The remainder of the procedure was identical to that described in the first paragraph of this example. The product VI, m.p. 116°–118°C., was obtained in 90.0 percent yield. After recrystallization from ethyl alcohol, it melted at 119°–120°C. A mixture melting point with the product obtained from the method described above without 1,3-propanedithiol was not depressed, and the infrared spectra of the two were superimposable. Analysis gave 57.16 percent sulfur as compared to 57.15 percent calculated for $C_7H_{12}S_4$. The mass spectrum of VI was in conformity with the structure assigned.

EXAMPLE 6

1,4,6,9-Tetrathiaspiro[4.4]Nonane (VII) from II

To 100 grams (1.0 mole) of 36.5 percent hydrogenchloride-methanol solution at 5°C., 36.1 grams (0.25 mole) of II and 23.5 grams (0.25 mole) of 1,2-ethanedithiol were added in one portion. After the removal of ice cooling, an exothermic reaction set in causing a temperature rise from 5° to 55°C. The stirred reaction mixture was heated at 65°–73°C. for 22 hours. After cooling the stirred reaction mixture to 0°C., 200 ml. of water was added dropwise at 0°–10°C. in 15 minutes. This was followed by the dropwise addition of 75 grams of concentrated ammonium hydroxide at 0°–10°C. over a 15-minute period. After stirring the reaction mixture at 0°–10°C. for 30 minutes, the precipitate was collected by filtration and air-dried at 25°–30°C. The product VII, m.p. 139°–141°C., was obtained in 46.9 percent yield. After recrystallization from ethyl acetate, it melted at 142°–143°C. The infrared spectrum as determined in chloroform and dimethylformamide contained bands at 2,980(M) and 2,900(M) (C—H st.), 1,417(M) (CH$_2$ def.), 1,272(S), 966(M), 948(M), 853(M), 799(VS), and 758(S) cm.$^{-1}$ The n.m.r. spectrum in CDCl$_3$ had a sharp singlet at 3.43 p.p.m. (δ) due to equivalent methylene groups. Analysis gave 30.40 percent carbon, 4.00 percent hydrogen, 65.31 percent sulfur, and a molecular weight of 196 as compared to 30.58 percent carbon, 4.11 percent hydrogen, 65.31 percent sulfur, and a molecular weight of 196.4 calculated for $C_5H_8S_4$. The mass spectrum of VII was in conformity with the structure assigned.

The bottom organic layer of the filtrate was separated and dried over sodium sulfate to obtain 20 grams of an amber-colored liquid. The vapor phase chromatography of this liquid gave 21.1 and 5.3 wt. percent or 8.6 and 4.5 percent (recovered) yield of VII and 1,2-ethanedithiol, respectively.

EXAMPLE 7

1,4,6,9-Tetrathiaspiro[4.4]Nonane(VII) from V 1,4,6,9-tetrathiaspiro[4.4]nonane was prepared from V in the identical procedure of Example 6 except that 40.6 grams (0.25 mole) of V was substituted for II and a temperature rise from 5° to 30°C. resulted upon the addition of the reactants. The product VII, m.p. 139°–141°C., was obtained in 59.3 percent yield. After recrystallization from ethyl alcohol, it melted at 142°–143°C. A mixture melting point with the product obtained from Example 6 was not depressed, and the infrared spectra of the two were superimposable. Analysis give 62.28 percent sulfur as compared to 65.31 percent calculated for $C_5H_8S_4$.

The separated organic layer from the filtrate (12 grams) gave 34.2 and 18.0 wt. percent or 8.4 and 9.2 percent yield (recovered) of VII and 1,2-ethanedithiol, respectively.

EXAMPLE 8

1,4,6,10-Tetrathiaspiro[4.5]Decane (VIII) from II and 1,3-Propanedithiol

To 100 grams (1.0 mole) of 36.5 percent hydrogenchloride-methanol solution at 5°C., 36.1 grams (0.25 mole) of II and 27.1 grams (0.25 mole) of 1,3-propanedithiol were added in one portion. After removal of ice cooling, an exothermic reaction set in causing a temperature rise from 5° to 45°C. over a 3-minute period. The stirred reaction mixture was heated at reflux for 22 hours. After cooling to 0°C., 200 ml. of water was added dropwise at 0°–10°C. This was followed by the dropwise addition of 75 grams of concentrated ammonium hydroxide at 0°–10°C. The reaction mixture was stirred at 0°–10°C. for 30 minutes. Since no solids were present, the bottom amber liquid was separated and dried over sodium sulfate. This liquid (43 grams) was resolved by vapor phase chromatography to give 12.5, 8.1, 40.8, 0.9, and 9.0 wt.

percent or 9.6, 7.1, 33.4, 1.6, and 14.3 percent yield (recovered) of VI, VII, VIII, 1,2-ethanedithiol, and 1,3-propanedithiol, respectively. The mixture melting point of VI and VII obtained from the vapor phase chromatogram with authentic samples of VI and VII was not depressed, and the infrared spectra of the samples were superimposable. The melting point of VIII was 129°–130°C. and its elution time was intermediate to VI and VII. The infrared spectrum of VIII had most of the absorption bands common to either VI or VII in the C—H stretching, C—H deformation, and skeletal regions: 2,980(M) and 2,900(M) (C—H st.), 1,422 (S), 1,417(M) ($CH_2$ def.), 1,274(S), 998(M), 966(W), 947(M), 905(M), 877(S), and 842(M) cm.$^{-1}$

EXAMPLE 9

VIII from III and 1,2-Ethanedithiol

To 100 grams of 36.5 percent hydrogen-chloride-methanol solution at 5°C., 39.6 grams (0.25 mole) of III, and 23.5 grams (0.25 mole) of 1,2-ethanedithiol were added in one portion. Upon the removal of external cooling, an exothermic reaction set in causing a temperature rise from 5° to 40°C. over a 10 minute period. The reaction mixture was stirred at 25°–30°C. for 22 hours. After cooling to 0°C., 200 ml. of water was added dropwise at 0°–10°C. To the stirred reaction mixture 75 grams of concentrated ammonium hydroxide was added dropwise at 0°–10°C. After stirring the reaction mixture at 0°–10°C. for 30 minutes, the resulting precipitate was collected by filtration and air-dried at 25°–30°C. The product mixture (28 grams) which contained VI, VII, and VIII melted at 103°–110°C. This mixture was resolved by vapor phase chromatography to give 6.0, 47.4, and 36.7 wt. percent or 3.0, 27.1, and 19.6 percent yield of VI, VII, and VIII, respectively. The bottom amber liquid of the filtrate was separated and dried over sodium sulfate. This liquid (23 grams) was resolved by vapor phase chromatography to give 10.2, 11.4, 21.7, and 11.8 percent or 4.2, 5.3, 9.5, and 10.0 percent yield of VI, VII, VIII, and 1,3-propanedithiol, respectively.

The charge and procedure was identical as described above except the stirred reaction mixture was heated at 73°–75°C. for 22 hours. Under these conditions, 13 grams solid, m.p. 113°–116°C., and 35 grams of an amber-colored liquid were obtained. The vapor phase chromatogram of this mixture furnished the following data:

| Compound No. | Source | Wt. % | % Yield |
| --- | --- | --- | --- |
| VI | solid | 9.1 | 2.1 |
|  | liquid | 10.5 | 6.6 |
| VII | solid | 46.5 | 12.3 |
|  | liquid | 13.0 | 9.3 |
| VIII | solid | 38.2 | 9.5 |
|  | liquid | 22.4 | 14.9 |
| $HSCH_2CH_2SH$ | liquid | 0.4 | 0.6* |
| $HS(CH_2)_3SH$ | liquid | 17.6 | 22.8 |

*Recovered.

EXAMPLE 10

VIII from VI and 1,2-Ethanedithiol

To 80 grams (0.8 mole) of 36.5 percent hydrogen-chloride-methanol solution at 5°C., 44.9 grams (0.2 mole) of VI and 18.9 grams (0.2 mole) of 1,2-ethanedithiol were added in one portion. External ice cooling was removed and the temperature of the stirred reaction mixture was allowed to reach 25°C. over a 30-minute period. The stirred reaction mixture was heated at reflux for 22 hours. After cooling to 0°C., 160 ml. of water was added dropwise at 0°–10°C. over a 15-minute period. This was followed by the dropwise addition of 60 grams of concentrated ammonium hydroxide at 0°–10°C. The stirred reaction mixture was stirred at 0°–10°C. for 30 minutes. The reaction mixture was filtered. Since no solids were present, the bottom amber liquid was separated and dried over sodium sulfate. This mixture (59 grams) was resolved by vapor phase chromatography and the following data were obtained:

| Compound No. | Wt. % | % Yield |
| --- | --- | --- |
| VI | 12.6 | 16.6* |
| VII | 9.5 | 14.3 |
| VIII | 22.7 | 31.8 |
| $HSCH_2CH_2SH$ | 1.9 | 6.0* |
| $HS(CH_2)_3SH$ | 28.2 | 76.9 |

*Recovered

The mixture melting point of VI, VII, and VIII obtained from the vapor phase chromatogram with authentic samples of VI, VII, and VIII was not depressed, and the infrared spectra of the samples were superimposable.

EXAMPLE 11

VIII from VII and 1,3-Propanedithiol

The charge for this reaction was the same as Example 10 except 39.3 grams (0.2 mole) of VII and 21.7 grams (0.2 mole) of 1,3-propanedithiol were substituted for VI and 1,2-ethanedithiol. The procedure was identical to Example 10 except 19 grams solid, m.p. 124°–128°C., and 35 grams of an amber-colored liquid were obtained. The solid and amber liquid were resolved by vapor phase chromatography, and the following data were obtained:

| Compound No. | Source | Wt. % | % Yield |
| --- | --- | --- | --- |
| VI | solid | none | none |
|  | liquid | 2.2 | 1.7 |
| VII | solid | 61.3 | 29.7* |
|  | liquid | 19.7 | 17.6* |
| VIII | solid | 17.8 | 8.0 |
|  | liquid | 16.8 | 14.0 |
| $HSCH_2CH_2SH$ | liquid | 8.4 | 15.6 |
| $HS(CH_2)_3SH$ | liquid | 29.7 | 48.0* |

*Recovered

Complete inhibition of growth of *Staphylococcus aureus*, *Salmonella typhosa*, and *Aspergillus niger* was observed at a concentration of 1 part by weight of III or IV in 1,000 parts by weight of carrier or vehicle. At the same concentration II completely inhibited growth of *Aspergillus niger*.

Germination of the common plant fungal pathogen *Venturia inaequalis*, the causative organism of apple scab, was inhibited by III and IV. This fungicidal activity was demonstrated by spore germination. In this procedure the experimental compound was formulated as a 30 p.p.m. aqueous solution. One drop of this solution was placed in a well of a concavity glass slide and two drops of a conidial suspension of *Venturia inaequalis* (adjusted to 625,000 per ml.) were added. The slides were then placed into a petri plate, water added to the plate to provide humidity, and the plate covered with a lid. After 24 hours, the cover was removed, the slides examined, and the observations recorded. With III or IV short germ tubes indicative of definite chemical activity against the organism were observed.

Inhibition of the growth of the soil fungi *Rhizoctonia solani* and *Phthium ultimum* was observed with III. Testing was conducted by blending cornmeal-sand cultures of the organism into autoclave-sterilized soil to achieve essentially a mono-organism soil-type. Soufflé cups with a capacity of 30 grams were filled with the soil-type, and 4 ml. of the experimental chemical (231 p.p.m.) were drenched over the surface of each. The final concentration based on soil weight was 30 p.p.m. The soufflé cups were then put into pans and these pans placed into an incubation chamber (90–100 percent relative humidity) for 48 hours. At the end of this time, the treatments were observed and the results recorded. A similar testing procedure was conducted with similar soil which had not been chemically treated. No growth of either organism was observed on the treated soil; whereas, normal growth was observed with the soil which had not been chemically treated.

At higher concentrations some of the new compounds are useful for destroying undesired vegetation. In pre-emergence application at a dosage of 25 pounds per acre, III severely inhibited (76–100 percent control) growth of foxtail, crab grass, and pigweed seedlings. At the same dosage, moderate phytotoxicity to pigweed and tomato was observed with II. Moderate phytotoxicity means that only 26–50 percent of the seedlings germinated and grew. In foliage application at a concentration of 0.5 percent, V was severely toxic to pigweed and wild buckwheat.

The vulcanization of rubber is accelerated by addition of V or VII to the stock. Tests were conducted in a stock comprising:

|  | Parts by weight |
| --- | --- |
| Natural rubber | 100 |
| High abrasion furnace black | 50 |
| Stearic acid | 3 |
| Zinc oxide | 5 |
| Hydrocarbon softener | 3 |
| Sulfur | 2.5 |
| Accelerator | 0.5 |

The stocks so compounded were heated in the usual manner in a press at 144°C.

| Accelerator | Cure time in mins. | Modulus of elasticity at 300% elongation in lbs./in.² | Tensile at break in lbs./in.² | Ultimate elongation, percent |
| --- | --- | --- | --- | --- |
| V | 60 | 930 | 1,560 | 430 |
| VII | 120 | 700 | 1,500 | 520 |

It is intended to cover all changes and modifications of the examples of the invention herein chosen for purposes of disclosure which do not constitute departures from the spirit and scope of the invention.

I claim:
1. A compound of the formula

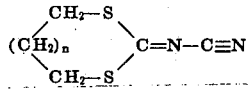

where $n$ is 0 or 1, inclusive.

2. A compound of claim 1 where $n$ is 0.
3. A compound of claim 1 where $n$ is 1.
4. A compound of the formula

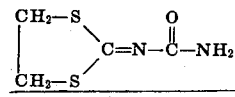

5. A method of controlling undesired plant growth which comprises applying to the locus wherein control is desired a herbicidal amount of a compound of the formula

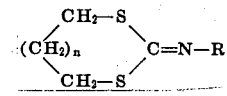

where $n$ is 0 or 1 and R is —CN or —CONH$_2$ with the proviso that when R is —CONH$_2$, $n$ is 0.

6. A method of controlling fungi which comprises applying to the locus wherein control is desired a fungicidal amount of a compound of the formula

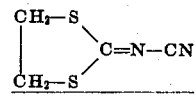

7. A method of controlling fungi which comprises applying to the locus wherein control is desired a fungicidal amount of a compound of the formula

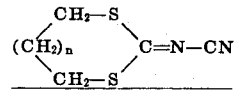

where $n$ is 0 or 1.

* * * * *